(12) United States Patent
Huber et al.

(10) Patent No.: US 12,203,511 B2
(45) Date of Patent: Jan. 21, 2025

(54) COUPLING DEVICE

(71) Applicants: Süddeutsche Gelenkscheibenfabrik GmbH & Co. KG, Waldkraiburg (DE); Siemens Mobility GmbH, Munich (DE)

(72) Inventors: Armin Huber, Schoenberg (DE); Martin Ebenhofer, Reut (DE); Wolfgang Orthofer, Jr., Muehldorf a. Inn (DE); Peter Seitz, Pommelsbrunn (DE); Freerk Jacobus Oude Kotte, Stein (DE)

(73) Assignees: Süddeutsche Gelenkscheibenfabrik GmbH & Co. KG;, Waldkraiburg (DE); Siemens Mobility GmbH, Munich (DE)

( * ) Notice: Subject to any disclaimer, the term of this patent is extended or adjusted under 35 U.S.C. 154(b) by 677 days.

(21) Appl. No.: 17/416,937

(22) PCT Filed: Dec. 18, 2019

(86) PCT No.: PCT/EP2019/085908
§ 371 (c)(1),
(2) Date: Jun. 21, 2021

(87) PCT Pub. No.: WO2020/127458
PCT Pub. Date: Jun. 25, 2020

(65) Prior Publication Data
US 2022/0042551 A1    Feb. 10, 2022

(30) Foreign Application Priority Data
Dec. 19, 2018  (DE) .................... 10 2018 010 053.8

(51) Int. Cl.
| | | |
|---|---|---|
| F16D 3/62 | (2006.01) | |
| B61F 5/50 | (2006.01) | |
| F16D 3/72 | (2006.01) | |

(52) U.S. Cl.
CPC ............... *F16D 3/62* (2013.01); *B61F 5/50* (2013.01); *F16D 3/72* (2013.01)

(58) Field of Classification Search
CPC ............... F16D 3/62; F16D 3/72; B61F 5/50
(Continued)

(56) References Cited

U.S. PATENT DOCUMENTS

| | | |
|---|---|---|
| 4,816,007 A | 3/1989 | Box |
| 5,562,545 A | 10/1996 | Wahling et al. |

(Continued)

FOREIGN PATENT DOCUMENTS

| | | |
|---|---|---|
| CN | 102066795 A | 5/2011 |
| CN | 104081075 A | 10/2014 |

(Continued)

OTHER PUBLICATIONS

German Search Report issued by the German Patent Office for German Patent Application No. 10 2018 010 053.8, dated Nov. 14, 2019.

(Continued)

*Primary Examiner* — Greg Binda
(74) *Attorney, Agent, or Firm* — Bradley Arant Boult Cummings LLP; Henry B. Ward, III

(57) ABSTRACT

A coupling device for a vehicle drive is provided, in particular of a rail vehicle drive, comprising at least one first coupling, which has at least one first thread-reinforced joint device, wherein the first thread-reinforced joint device has at least one thread pack, which is embedded into at least one elastic body; the at least one first coupling device has at least one supporting device, which is connected to the first (Continued)

thread-reinforced joint device; the at least one supporting device supports the first thread-reinforced joint device in the radial direction.

21 Claims, 17 Drawing Sheets

(58) Field of Classification Search
USPC .................................................. 464/69, 85
See application file for complete search history.

(56) References Cited

U.S. PATENT DOCUMENTS

| | | | | |
|---|---|---|---|---|
| 7,052,399 | B2 * | 5/2006 | Duggan | .................... F16D 3/60 |
| | | | | 464/69 |
| 10,400,828 | B2 * | 9/2019 | Huber | ....................... B61C 9/52 |
| 10,794,429 | B2 * | 10/2020 | Huber | ..................... F16D 1/076 |

FOREIGN PATENT DOCUMENTS

| | | | | |
|---|---|---|---|---|
| CN | 105705826 | A | | 6/2016 |
| DE | 682 308 | | * 9/1939 | ..................... 464/90 |
| DE | 2547377 | C3 | | 4/1977 |
| DE | 102006038431 | A1 | | 3/2008 |
| DE | 202013006950 | U1 | | 8/2013 |
| DE | 102014018842 | A1 | | 6/2016 |
| DE | 102015009195 | A1 | | 1/2017 |
| DE | 102015010195 | A1 | | 2/2017 |
| GB | 770768 | A | | 5/1955 |
| JP | 2010078082 | A | | 4/2010 |
| WO | 2016/097195 | A1 | | 6/2016 |
| WO | 2017009141 | A1 | | 1/2017 |
| WO | 2017025301 | A1 | | 2/2017 |

OTHER PUBLICATIONS

International Search Report dated Mar. 13, 2020 for corresponding application PCT/EP2019/085908.
International Preliminary Report on Patentability dated Oct. 30, 2020 for corresponding application PCT/EP2019/085908.
Office Action issued by the Chinese Patent Office for Chinese Patent Application No. 201980084805.X, dated Mar. 21, 2024.

* cited by examiner

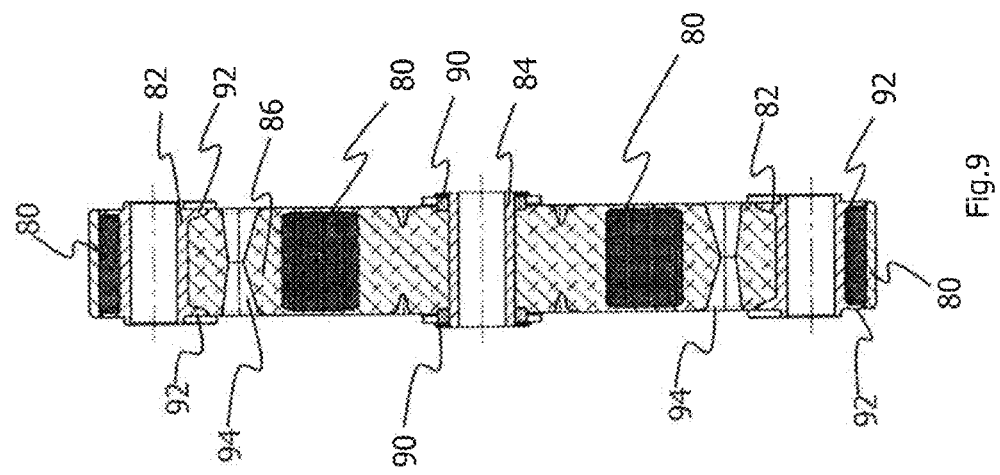
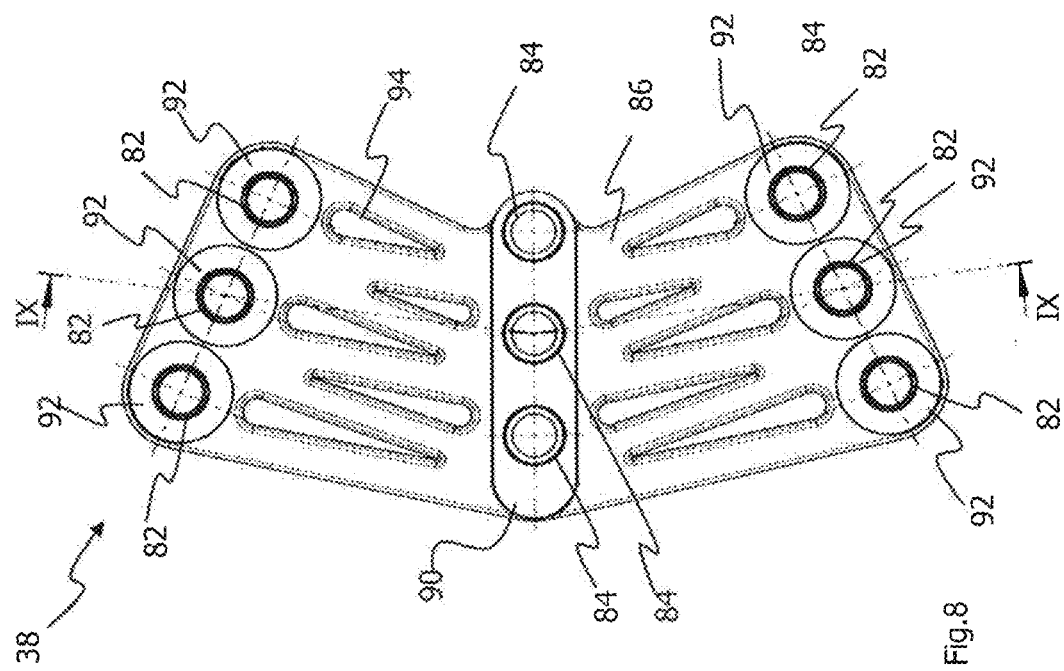

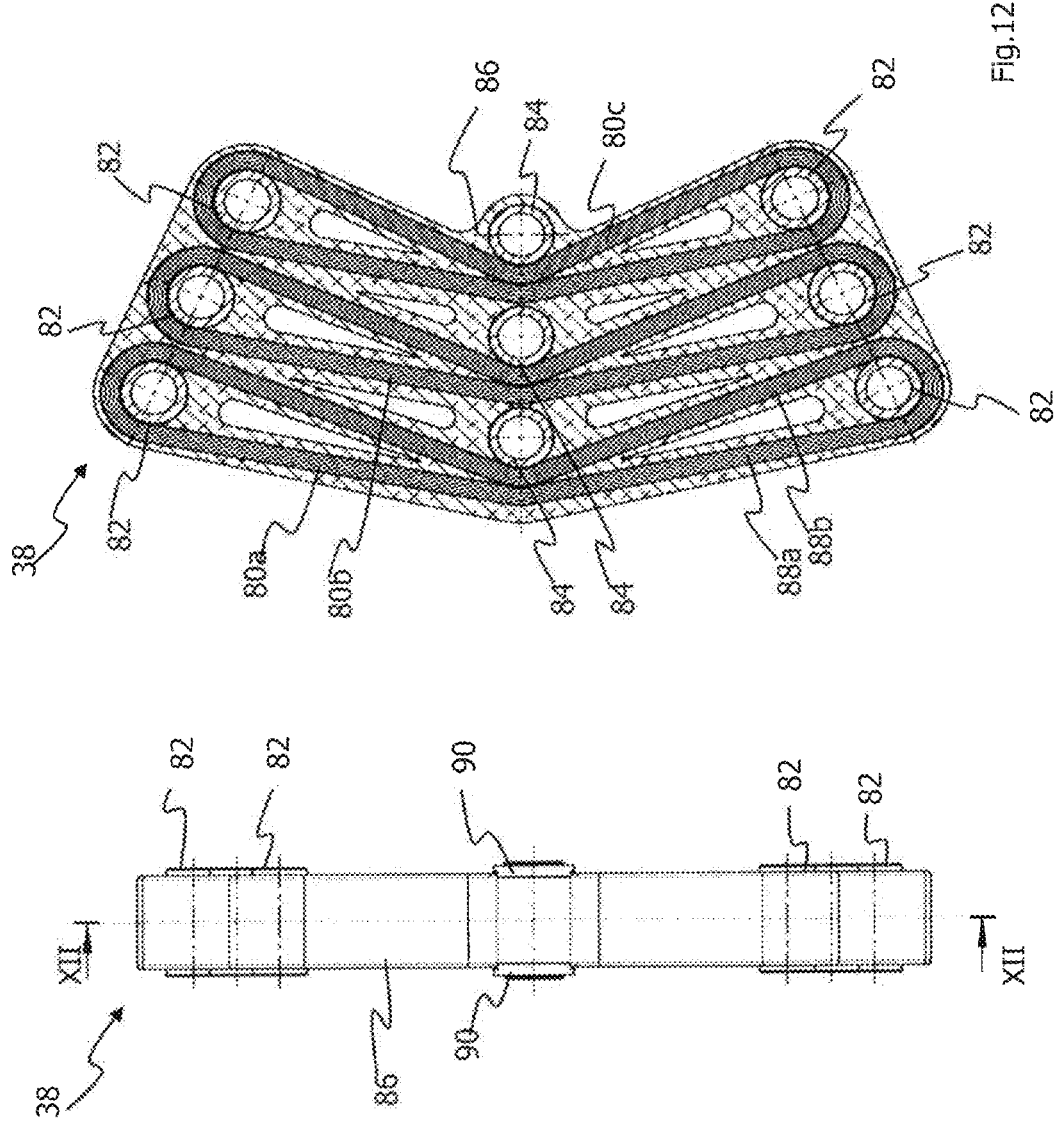

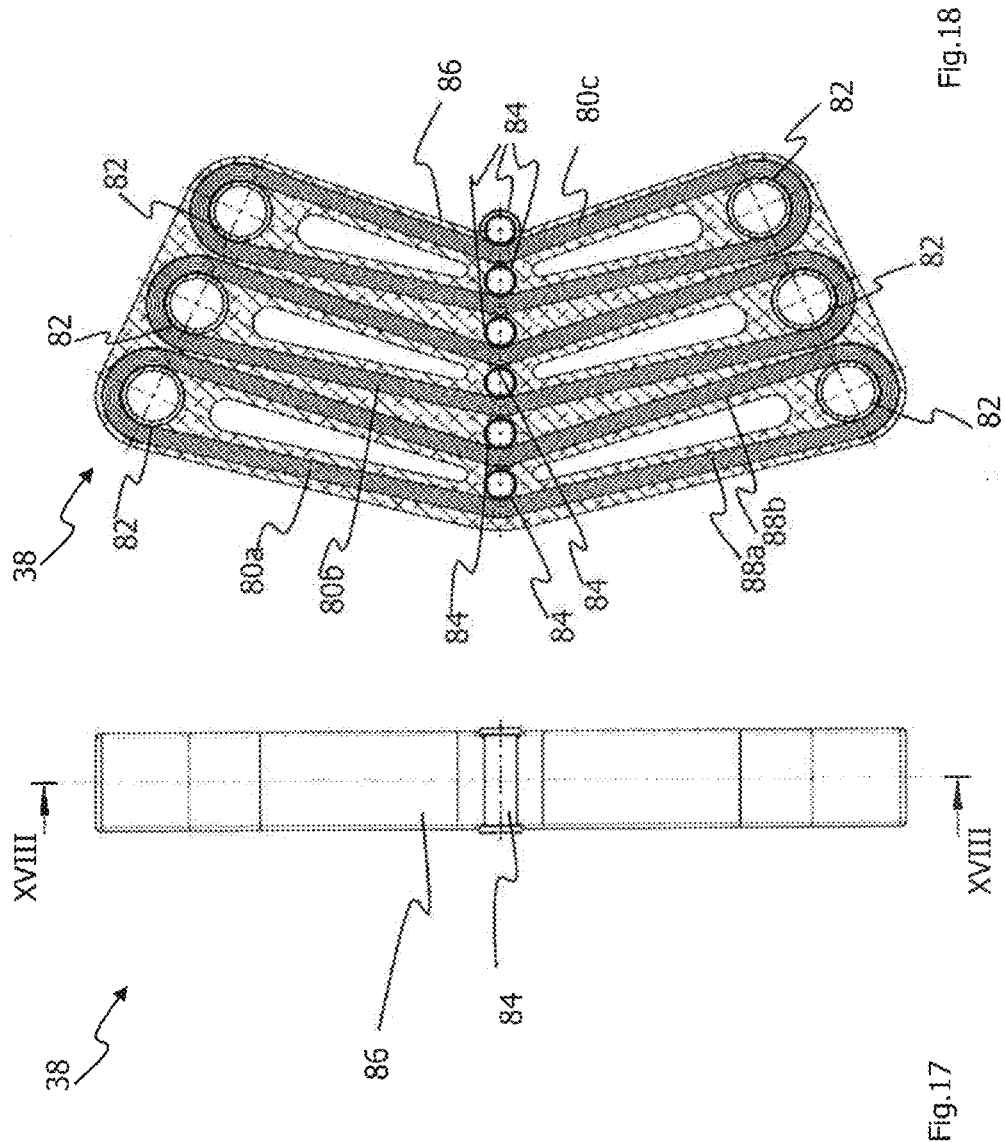

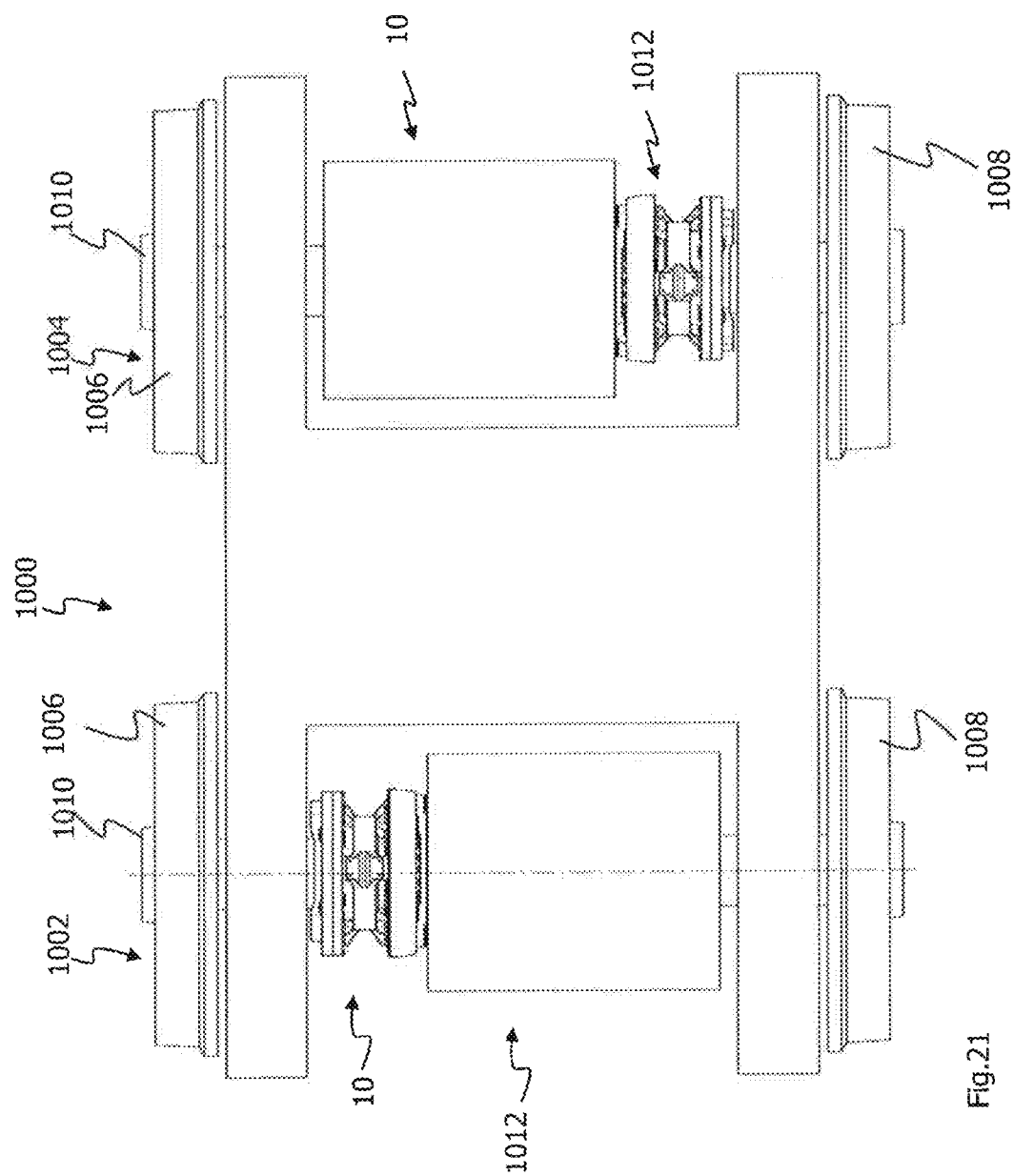

COUPLING DEVICE

BACKGROUND OF THE INVENTION

The present invention relates to a coupling device, in particular for a vehicle drive. The present invention relates in particular to a coupling device for a rail vehicle drive. Furthermore, the present invention relates to a thread-reinforced coupling element for such a coupling device. Moreover, a bogie for a rail vehicle and a rail vehicle form the subject matter of the present invention.

SUMMARY OF THE INVENTION

An object of the present invention is to provide a coupling device of the type described at the beginning that makes optimal use of the installation space available in a radial direction, requires little installation space in an axial direction and can absorb large deflection angles.

This object is achieved by a coupling device for a vehicle drive, comprising at least one first coupling, which has at least one first thread-reinforced joint device. The first thread-reinforced joint device has at least one thread packet, which is embedded into at least one elastic body. The at least one first coupling has at least one supporting device, which is connected to the first thread-reinforced joint device, wherein the at least one supporting device supports the first thread-reinforced joint device in a radial direction.

Other According to other embodiments of the invention, the coupling device has at least one second coupling, which has at least one second thread-reinforced joint device, wherein the second thread-reinforced joint device has at least one thread packet, which is embedded into at least one elastic body, and at least one intermediate piece, which connects the first coupling and the second coupling to one another. In another embodiment, the at least one second coupling has at least one supporting device, which is connected to the second thread-reinforced joint device, wherein the at least one supporting device supports the second thread-reinforced joint device in a radial direction. In another embodiment, the at least one supporting device is supported in an overhung manner. In another embodiment, the at least one supporting device has several supporting elements which extend in a radial direction and are connected to the thread-reinforced joint device. In another embodiment, the at least one supporting device has at least one portion, which connects the supporting elements to one another and at least one selected from the group consisting of (i) extends radially outside the first or second thread-reinforced joint device and (ii) extends radially inside the first or second thread-reinforced joint device. In another embodiment, the at least one supporting device supports the at least one thread packet of the first thread-reinforced joint devices or of the second thread-reinforced joint devices in a radial direction. In another embodiment, the at least one intermediate piece is supported in an overhung manner. In another embodiment, at least one selected from the group consisting of (i) the first coupling is connected to a first flange, which has a hub-shaped portion, and (ii) the second coupling is connected to a second flange, which is formed with a connecting portion to take up several connecting elements. In another embodiment, the first flange and the second flange each have several first and second flange arms, which are connected via the first and the second thread-reinforced joint device to arms of the intermediate piece, wherein supporting elements are arranged in a circumferential direction between the flange arms of the first flange and the arms of the intermediate piece or the flange arms of the second flange and the arms of the intermediate piece. In another embodiment, at least one selected from the group consisting of the first thread-reinforced joint device and the second thread-reinforced joint device are composed of several thread-reinforced coupling elements, which each have at least one elastic body and at least one thread packet. In another embodiment, at least one selected from the group consisting of (i) a thread-reinforced coupling element connects a flange arm of the first flange, an arm of the intermediate piece and a supporting element to one another, and (ii) wherein a thread-reinforced coupling element connects a flange arm of the second flange, an arm of the intermediate piece and a supporting element to one another.

In another embodiment, a bogie for a rail vehicle is provided comprising at least one wheelset, which has an axle, at least one motor, and at least one coupling device according to the present invention, wherein the coupling device couples the motor to the axle. In another embodiment, at least one selected from the group consisting of the motor and the at least one coupling device are arranged coaxially with the axle. In another embodiment, the at least one selected from the group consisting of (i) the first flange of the coupling device is connected non-rotatably to the axle and (ii) the second flange of the coupling device is connected via the connecting portion to a motor output shaft of the motor.

In another embodiment, a rail vehicle is provided comprising at least one coupling device according to the present invention. In another embodiment, a rail vehicle is provided comprising at least one bogie according to the present invention.

The coupling device for a vehicle drive comprises
at least one first coupling, which has at least a first thread-reinforced joint device, wherein the first thread-reinforced joint device has at least one thread packet, which is embedded into at least one elastic body,
wherein the at least one first coupling has at least one supporting device, which is connected to the first thread-reinforced joint device, wherein the at least one supporting device supports the first thread-reinforced joint device in the radial direction.

Due to the supporting device, the number of coupling planes of the first and/or the second coupling is increased. Due to the supporting device, the first and/or the second coupling form two partial couplings connected in series, whereby the coupling device can absorb large deflection angles. The two partial couplings are arranged within the first or the second coupling and within the coupling device at the same axial position. For this reason, the coupling device takes up little installation space in an axial direction. Expressed another way, the partial couplings of the first and/or of the second coupling are arranged tangentially and thus in a manner saving installation space. Due to this arrangement of the partial couplings, the at least one intermediate piece can be implemented with a predetermined axial extension.

The first thread-reinforced joint device or second thread-reinforced joint device can be held by the supporting device in a predetermined radial position, so that the radial installation space available can be optimally utilised. In particular, the respective thread-reinforced joint device can be held by the at least one supporting device in a predetermined radial position in which the thread-reinforced joint device can assume the form of a polygon when seen in an axial direction. An improved utilisation of an available radial or hollow cylindrical installation space can be achieved in this way.

The coupling device can further comprise at least one second coupling, which has at least one second thread-reinforced joint device, wherein the second thread-reinforced joint device has at least one thread packet, which is embedded into at least one elastic body. At least one intermediate piece can be provided, which connects the first coupling and the second coupling to one another. The at least one second coupling can have at least one supporting device, which is connected to the second thread-reinforced joint device, wherein the at least one supporting device can support the second thread-reinforced joint device in the radial direction.

The at least one supporting device can be supported in an overhung manner. The at least one supporting device can only be in contact with the thread-reinforced joint device associated with it or can only be connected to this thread-reinforced joint device. The supporting device is designed so that it does not have to be supported on other components of the coupling device.

The at least one supporting device can have several supporting elements. The supporting elements can extend in a radial direction. The supporting elements can be connected to the thread-reinforced joint device. The supporting elements can extend inwards or outwards in a radial direction. The supporting device can have several supporting elements offset in an axial direction to one another, which can take up the joint device associated with the supporting device between them. Expressed another way, supporting elements of the supporting device that are connected to the respective thread-reinforced joint device can extend on the two axial sides of the thread-reinforced joint devices. The supporting elements can be connected to the thread-reinforced joint device via connecting elements. These connecting elements can be screws in particular. At least some of the supporting elements can have an opening with an internal thread into which the connecting elements can be screwed. The connecting elements can thus be led through a supporting element and the thread-reinforced joint device and screwed to another radial supporting element.

The at least one supporting device can be designed in multiple parts. The supporting device can be constructed in two parts, for example. The two parts of the supporting device can be mounted on the thread-reinforced joint device associated with the supporting device and joined together. The connection between the parts of the supporting device can be made via the connecting elements with which the thread-reinforced joint device is also mounted on the supporting device.

The at least one supporting device can be designed so that all supporting elements are connected to one another. The at least one supporting device can have at least one annular portion that connects the individual supporting elements to one another. The at least one annular portion can extend radially externally around the supporting elements and connect these to one another. The at least one annular portion can further extend radially internally along the supporting elements and connect these to one another. The at least one annular portion can extend radially outwards or radially inwards of the thread-reinforced joint devices. The annular portion can have a predetermined axial extension, which is at least greater than or equal to the axial extension of the thread-reinforced joint devices. The at least one supporting device can have at least one annular element, starting out from which the supporting elements extend inwards or outwards in a radial direction.

The at least one intermediate piece can be supported in an overhung manner. The at least one intermediate piece can be connected exclusively to the thread-reinforced joint devices. The at least one intermediate piece can be not supported on other components of the coupling device.

The first coupling can be connected to a first flange, which has a hub-shaped portion. The hub-shaped portion can be formed tubular. The hub-shaped portion can extend in the direction of the intermediate piece. The hub-shaped portion can extend through one of the thread-reinforced joint devices and/or through the supporting device. The first flange can have several first flange arms. The first flange arms can extend radially outwards starting from the hub-shaped portion. The first flange can have three first flange arms. The first flange can also have more than three flange arms.

The second coupling can be connected to a second flange. The second flange can have a connecting portion, which is designed to receive several connecting elements. The second flange can have several second flange arms. The second flange can have three flange arms. The second flange can also have more than three flange arms. The second flange can be part of a flange device, which can have at least one cover as well as the second flange. The at least one cover can extend radially externally around the supporting device and the thread-reinforced joint device. The thread-reinforced joint devices and the supporting device can thus be arranged radially within the cover.

The intermediate piece can be formed tubular. The intermediate piece can have several arms. The arms of the intermediate piece can extend in a radial direction. In particular, the arms of the intermediate piece can extend outwards in a radial direction. Radial arms can be provided at each axial end of the intermediate piece. Three arms can be formed at each axial end of the intermediate piece. The first thread-reinforced joint device can be connected to the first flange arms of the first flange and the arms at an axial end of the intermediate piece. The second thread-reinforced joint device can be connected to the second flange arms of the second flange and the arms at the respectively other axial end of the intermediate piece. The radial supporting elements of the supporting device of the first coupling can be arranged in the circumferential direction between the first flange arms and the arms of the intermediate piece. The radial supporting elements of the supporting device of the second coupling can be arranged in the circumferential direction between the second flange arms and the arms of the intermediate piece.

The thread-reinforced joint devices can have at least one deflection element, which can be connected to the supporting device. The at least one deflection element can be designed in the form of a bush. A connecting element which connects the thread-reinforced joint devices to the supporting elements of the supporting device can extend through the at least one deflection element. The supporting device can engage on the thread-reinforced joint device via the at least one deflection element.

The first thread-reinforced joint device and/or the second thread-reinforced joint device can be composed of several thread-reinforced coupling elements, which each have at least one elastic body. The thread-reinforced coupling elements can have at least two bushes and at least one thread packet that loops around the two bushes.

At least the at least one thread packet can be embedded into the at least one elastic body. The at least one thread packet can be held on the bushes via one or more collar elements. The collar element or the collar elements can be pushed onto the bushes in an axial direction of the bushes and hold the at least one thread packet in its predetermined axial position. The collar elements can be formed integrally with the bushes. The collar elements can extend away from the tubular bushes in a radial direction. The bushes and the collar elements can also be embedded at least partially or in portions into the at least one elastic body. The bushes can be connected to one of the flanges and the intermediate piece so that a torque-transmitting connection can be created between the two flanges via the thread-reinforced joint device. For example, three bushes can be associated with one of the flanges and three bushes associated with the intermediate piece. These bushes can then be connected to the respective flange and the intermediate piece. The thread packets and the bushes can be embedded at least in portions into at least one elastic body.

The at least one supporting device can be formed so that it can deflect the thread packets of the thread-reinforced joint devices. The at least one supporting device can preferably deflect the thread packets in the area between two corresponding bushes. The number of bushes can correspond to the number of supporting elements.

A thread-reinforced coupling element can connect a first flange arm of the first flange, an arm of the intermediate piece and a supporting element. A thread-reinforced coupling element can connect a flange arm of the second flange, an arm of the intermediate piece and a supporting element.

The supporting device can have at least one common plane with the first flange arms and/or the second flange arms, which plane extends perpendicular to the centre line of the coupling. The same applies to the arms of the intermediate piece. At least the portions of the flange arms of the first flange and of the second flange extending in a radial direction and the supporting elements of the supporting device can have a common plane. The axial extension of the supporting device can overlap at least with the axial extension of the radial portions of the first flange arms and/or the second flange arms at least in portions. In addition or alternatively, the axial extension of the supporting device can further overlap also with the axial extension of the elastic elements. This overlap preferably occurs in a radial direction. The axial extension of the supporting device can correspond to the axial extension of the radial portions of the flange arms of the first flange and/or of the second flange. The above implementations can also apply by analogy to the receiving of the intermediate piece.

The present invention further relates to a thread-reinforced coupling element. The thread-reinforced coupling element comprises at least one thread packet, at least two bushes, wherein the at least one thread packet loops around at least two of the bushes, and at least one deflection element, wherein the at least one thread packet between the at least two bushes rests on the at least one deflection element.

The at least one deflection element can be arranged in a circumferential direction between the two bushes. The thread packet does not loop around the at least one deflection element or only loops partially around it. The thread packet can form two strands in the area between the bushes. The strands of the thread packet are brought closer to one another by the deflection element, so that at least one of the strands runs in a kinked or curved manner. Both strands can also have a kink or a curvature, wherein the strand resting on the deflection element is kinked or curved more strongly. The at least one deflection element can divide the thread packet into two limbs, which each have a bush and run at an angle to one another. The at least one thread packet, the at least two bushes and the at least one deflection element can be embedded into an elastic body at least in portions. The at least one deflection element can be arranged in the area between the bushes.

The thread-reinforced coupling element can have several thread packets. Each thread packet can loop around precisely two bushes. The thread-reinforced coupling element can have several deflection elements, which are connected to one another via at least one connecting element. At least one deflection element can be associated with the at least one thread packet. A bush around which a thread packet loops is only looped around by this thread packet but not by another thread packet. Each thread packet can form a unit with the two bushes. A thread-reinforced coupling element can have several such units. These units can be embedded at least partially into an elastic body. A thread-reinforced coupling element can have two, three or more thread packets, for example.

The deflection elements can be arranged in an area between the bushes. The deflection elements can be connected to one another via connecting elements, which are arranged at the axial ends of the deflection elements. The deflection elements can be designed in the form of bushes. Arranged on the bushes can be collar elements, which can hold the thread packets on the bushes. At least some of the bushes, the collar elements, the deflection elements and the plate-shaped connecting elements can be embedded at least partially into an elastic body. A coupling element can have three thread packets, for example. Each of the thread packets can loop around two bushes. Each of the thread packets can form a unit with two bushes, which are looped around by the thread packet. The deflection elements, which can deflect and support the thread packets, can be provided between the bushes. The deflection elements can be connected to one another via plate-shaped connecting elements. A deflection element can bring the two strands formed by the thread packet between the bushes closer to one another, so that one of the strands can assume a more strongly kinked course than the other strand respectively. Each of the thread packets can thus run in a curved or kinked manner between the bushes.

Depending on their loading (tensile or compression), the thread-reinforced coupling elements can be pulled radially inwards or pressed radially outwards without the supporting device. The supporting device can support the coupling elements in a radial direction. The supporting device can hold the thread-reinforced coupling elements in their predetermined radial position. This can apply in particular to the area of the deflection elements, which can be connected to the supporting elements. The supporting elements can in particular prevent the central area with the deflection elements of the thread-reinforced coupling elements between the bushes from being displaced in the direction of the centre line. The supporting elements can accordingly ensure that the coupling or the unit formed from the supporting device and the thread-reinforced coupling elements can retain its polygonal structure even during operation of the coupling. Large deflection angles can be compensated for thereby and the radial installation space optimally utilised, as a polygon with as many edges as possible can optimally fill an installation space in the form of a circle or a hollow cylinder.

The present invention further relates to a bogie for a rail vehicle. The bogie comprises at least one wheelset, which has an axle, at least one motor and at least one coupling device, wherein the coupling device couples the motor to the axle.

The motor and/or the at least one coupling device can be arranged coaxially with the axle. The axle can extend through the coupling device and/or the motor. The first flange of the coupling device can be connected non-rotatably to the axle. The first flange can be pressed with the hub-shaped portion onto the axle. The second flange can be connected via its connecting portion to a motor output shaft. A predetermined radial distance can be set between the second flange and the axle. A predetermined radial distance can be set between the intermediate piece and the axle. The connecting portion can be connected to the motor output shaft in particular via connecting elements. The connecting portion can be screwed to the motor output shaft.

The present invention further relates to a rail vehicle with at least one such coupling device or at least one such bogie.

BRIEF DESCRIPTION OF THE SEVERAL VIEWS OF THE DRAWING

Exemplary embodiments are described below with reference to the enclosed figures. There are depicted:

FIG. 8 a plan view of a thread-reinforced coupling element according to a first exemplary embodiment;

FIG. 9 an elevation view of a thread-reinforced coupling element according to a first exemplary embodiment;

FIG. 11 a plan view of a thread-reinforced coupling element according to a first exemplary embodiment;

FIG. 12 an elevation view of a thread-reinforced coupling element according to a first exemplary embodiment;

FIG. 17 a plan view of a thread-reinforced coupling element according to a second exemplary embodiment;

FIG. 18 an elevation view of a thread-reinforced coupling element according to a second exemplary embodiment;

FIG. 21 a plan view of a bogie of a rail vehicle with the coupling device according to FIGS. 1 to 6.

DETAILED DESCRIPTION OF THE INVENTION

Figure 1:
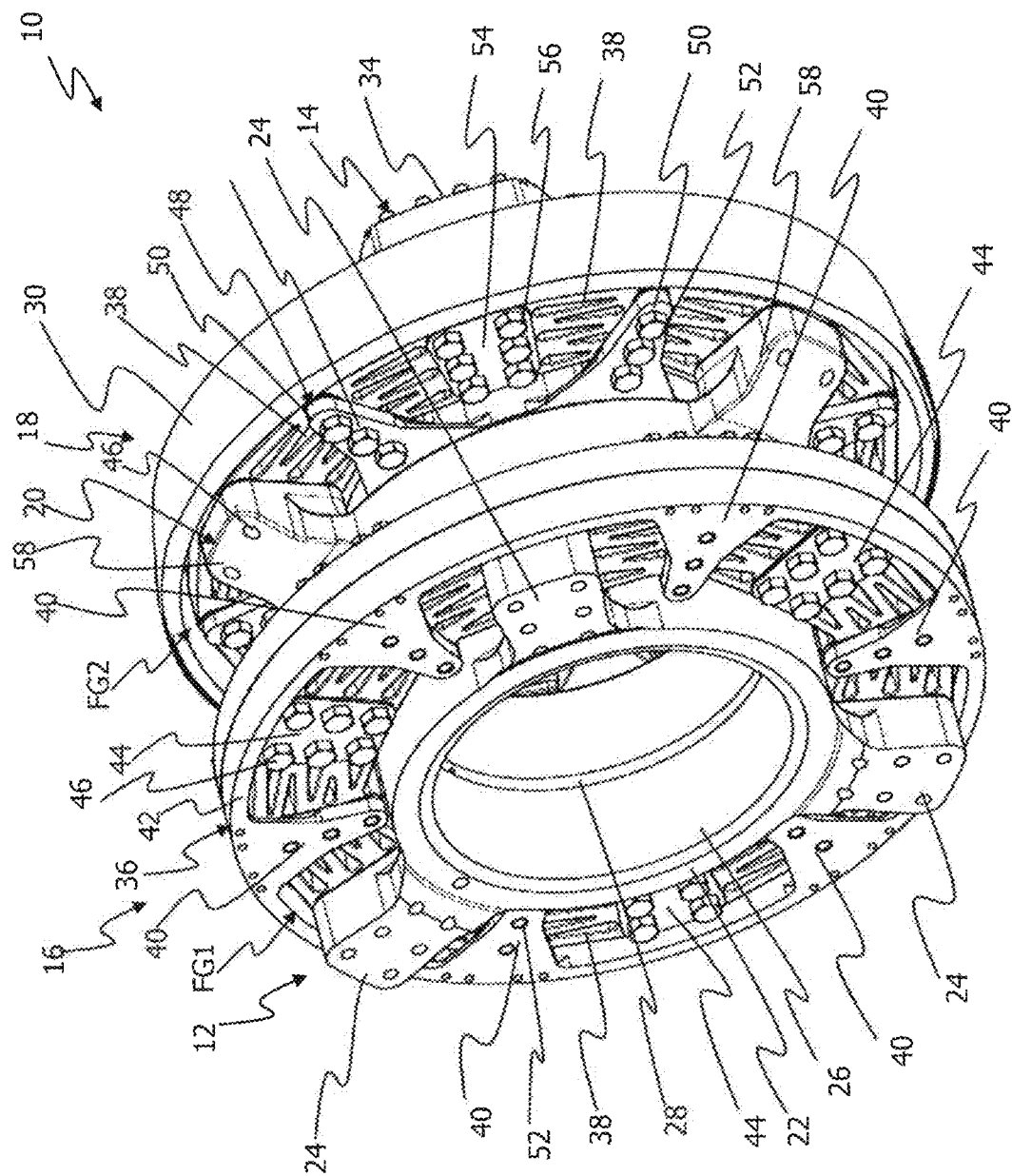
FIG. 1 a perspective view of a coupling device according to an embodiment of the invention.

FIG. 1 shows a perspective view of a coupling device 10. The coupling device 10 comprises a flange 12 and a flange device 14. Arranged between the flange 12 and the flange device 14 are a first coupling 16, a second coupling 18 and an intermediate piece 20, which connects the first coupling 16 to the second coupling 18.

The (first) flange 12 has a hub-shaped portion 22 and three (first) flange arms 24, which extend radially outwards starting from the hub-shaped portion 22. The hub-shaped portion 22 extends in a tubular manner in the direction of the intermediate piece 20. The hub-shaped portion 22 has an opening 26, on the inner circumferential area of which a groove 28 is formed. The first flange 12 can be pressed with its hub-shaped portion 22 onto an axle (not shown) of a wheelset of a rail vehicle.

The flange device 14 has a cover 30 and a screwed portion 34 with which the flange device 14 can be connected to a motor, which is not shown.

The first coupling 16 has a supporting device 36 and several thread-reinforced coupling elements 38. The thread-reinforced coupling elements 38 form a thread-reinforced joint device FG1. The supporting device 36 has several radial supporting elements 40 and an annular portion 42. The supporting elements 40 extend radially inwards starting from the annular portion 42. The supporting elements 40 are connected to the thread-reinforced coupling elements 38.

Apart from their connection to the supporting elements 40, the thread-reinforced coupling elements 38 are also connected to the flange arms 24 of the flange 12 and the intermediate piece 20. The connection of the thread-reinforced coupling elements 38 to the intermediate piece 20 is indicated by the connection plates 44 and the connecting elements 46 associated with these connection plates 44. The connecting elements 46 can be screws or bolts.

The second coupling 18 comprises the thread-reinforced coupling elements 38 and a supporting device 48 with supporting elements 50 extending radially outwards. The thread-reinforced coupling elements 38 form a thread-reinforced joint device FG2.

The supporting elements 40 and 50 of the supporting devices 36 and 48 are connected via connecting elements 52 to the thread-reinforced coupling elements 38. The connecting elements 52 extend through the coupling elements 38. The supporting devices 36 and 48 each have supporting elements, which are offset to one another in an axial direction and between which the coupling elements 38 are arranged, wherein only the supporting elements 40 and 50 are shown in FIG. 1. The connecting elements 52 extend between these two supporting elements 40, 50 offset axially to one another and thereby through the coupling elements 38. Some of the supporting elements offset axially to one another can have an internal thread. If screws are provided as connecting elements 52, these can be screwed into the internal thread of the supporting elements to connect the supporting device 36, 48 to the coupling elements 38. The coupling elements 38 of the second coupling 18 are connected to the flange device 14, as shown by the connection plates 54 and connecting elements 56. The connecting elements 56 extend through the coupling elements 38 in the direction of the flange device 14.

The intermediate piece 20 has arms 58 which extend radially outwards. The intermediate piece 20 is connected via the arms 58 to the coupling elements 38 of the second coupling 18.

Figure 2:
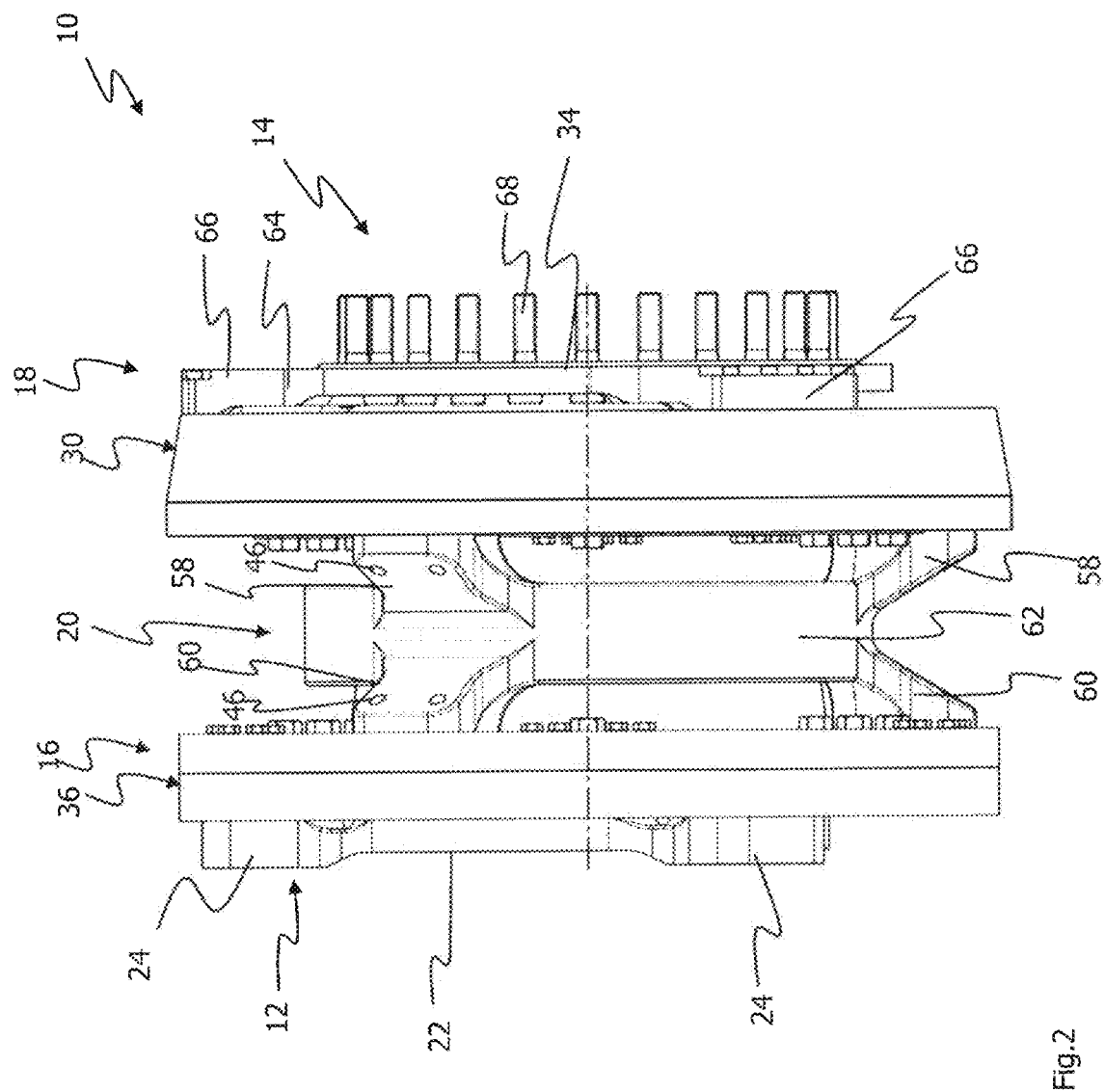
FIG. 2 a plan view of the coupling device according to FIG. 1.

FIG. 2 shows a plan view of the coupling device 10. The coupling device 10 comprises the flange 12, the flange device 14 and the couplings 16 and 18, which are arranged in an axial direction between the flange 12 and the flange device 14 and are connected to one another via the intermediate piece 20.

The intermediate piece 20 has the arms 58 and 60 extending in a radial direction. The arms 58 serve to connect the intermediate piece 20 to the coupling elements of the second coupling 18, which are not shown in FIG. 2. The arms 60 connect the intermediate piece 20 to the thread-reinforced coupling elements of the first coupling 16, which are not shown in FIG. 2. The arms 58 and 60 of the intermediate piece 20 extend radially outwards starting from an annular or tubular portion 62.

The flange device 14 has the cover 30, within which the supporting device 48 and the thread-reinforced coupling elements 38 (see FIG. 1) extend. As well as the cover 30, the flange device 14 comprises a (second) flange 64 on which the connecting portion 34 is formed. The flange 64 has (second) flange arms 66. The flange 64 is connected, in particular screwed, to the cover 30 via the flange arms 66.

The connecting portion 34 comprises several connecting elements 68. The connecting elements 68 can be screws. The connecting elements 68 extend in an axial direction. The connecting elements 68 serve to connect the flange device 14 to a motor output shaft of a motor (not shown).

Figure 3:
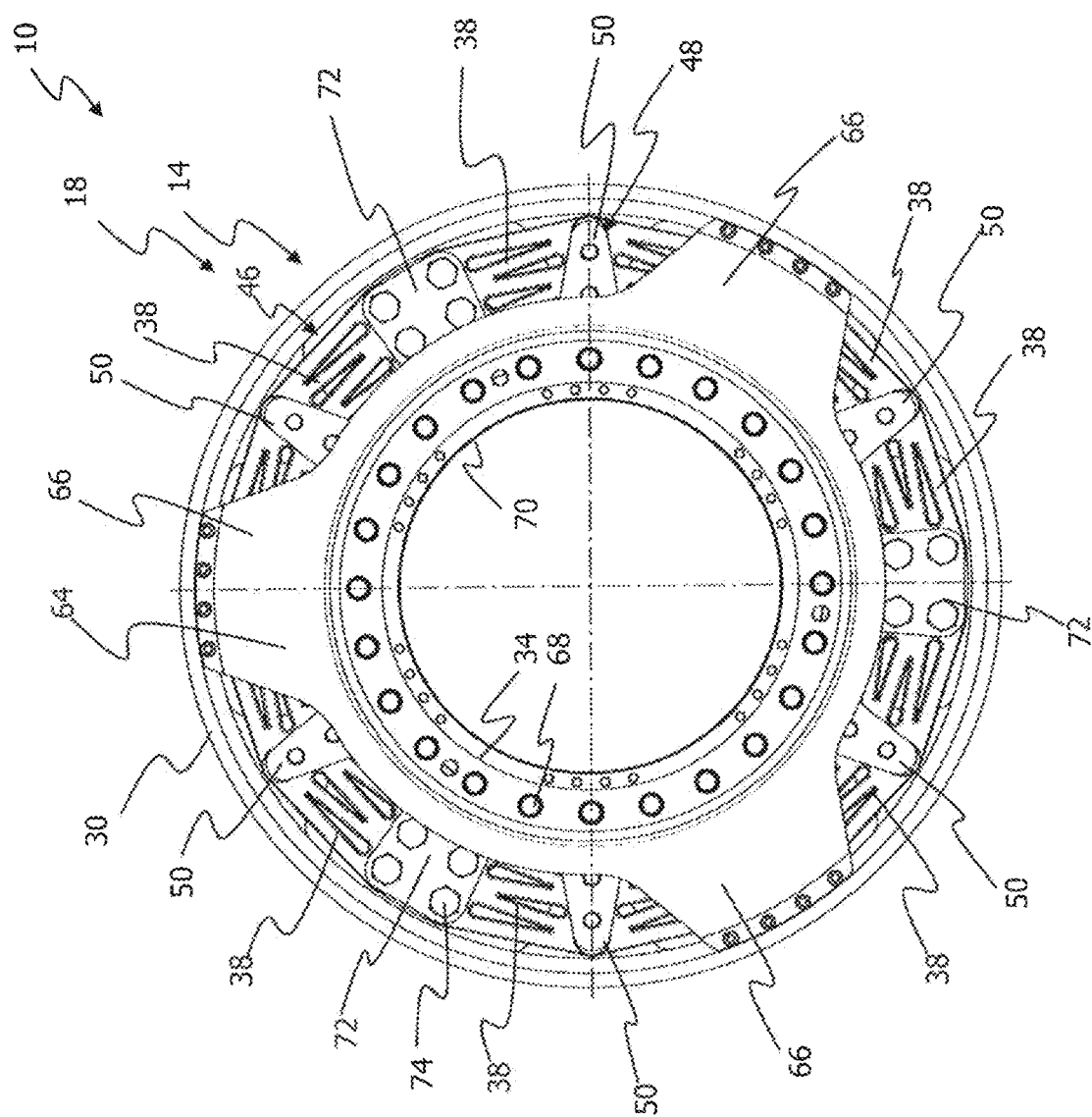
FIG. 3 a lateral view of the coupling device according to FIGS. 1 and 2.

FIG. 3 shows a lateral view of the coupling device 10 looking onto the flange device 14 and the coupling 18. The flange device 14 has the flange 64 and the cover 30. The cover 30 is connected to the flange arms 66 of the flange 64. The flange arms 66 extend outwards in a radial direction from the connecting portion 34, on which the connecting elements 68 are recognisable. The flange device 14 or the flange 64 has an opening 70 through which an axle (not shown) can extend. The opening 70 is dimensioned such that the axle (not shown) cannot contact the flange 64 or the connecting portion 34. The flange 64 is connected via the flange arms 66 to the thread-reinforced coupling elements 38 of the thread-reinforced joint devices FG2 or the second coupling 18. The thread-reinforced coupling elements 38 are connected in their central area in a circumferential direction to the supporting elements 50 of the supporting device 48.

The supporting elements 50 extend outwards in a radial direction. The supporting device 48 and the coupling elements 38 are enclosed in a radial direction by the cover 30. The coupling elements 38 are connected to the intermediate piece 20 (see FIG. 2). This is indicated by the connection plates 72 and the connecting elements 74 associated with the connection plates 72. The cover 30 is connected to the radially outer end portions of the coupling arms 66. In particular, the flange arms 66 can be screwed to the cover 30.

Figure 4:
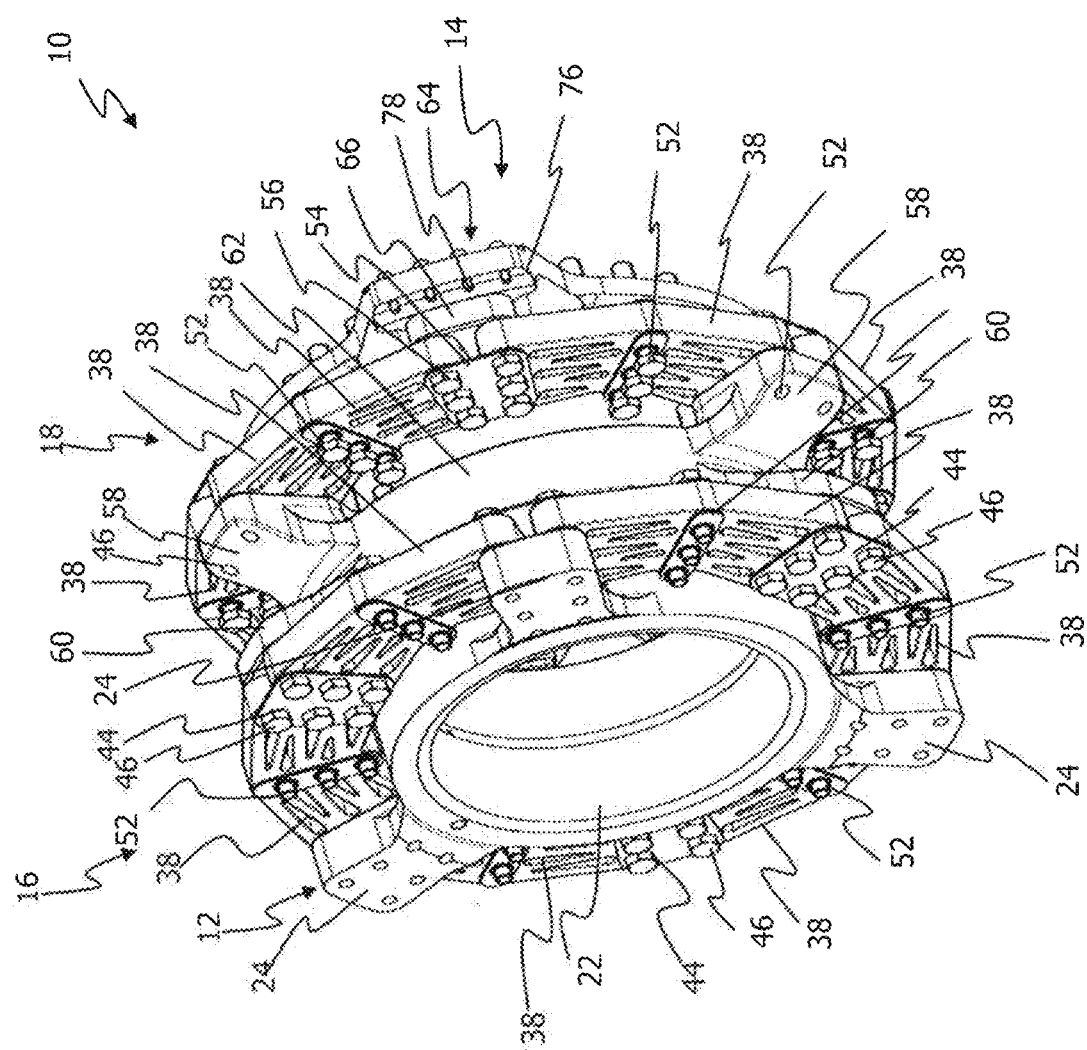
FIG. 4 a perspective view of the coupling device without supporting devices.

FIG. 4 shows a perspective view of the coupling device 10, in which the supporting devices 36 and 48 and the cover 30 of the flange device 14 have been removed. The flange 12 has the flange arms 24, which extend starting from the hub-shaped portion 22. The hub-shaped portion 22 extends through the coupling elements 38 in the direction of the intermediate piece 20. The flange arms 24 are connected to the thread-reinforced coupling elements 38. In their central area the thread-reinforced coupling elements 38 have deflection elements (not shown), through which connecting elements 52 extend. The coupling elements 38 are connected via the connecting elements 46 to the arms 60 of the intermediate piece 20. The arms 58 of the intermediate piece 20 are connected to the thread-reinforced coupling elements 38 of the coupling 18 likewise via connecting elements 74. The coupling elements 38 of the coupling 18 likewise have deflection elements, which are not shown, in their central area. Extending through these deflection elements are the connecting elements 52, which connect the thread-reinforced coupling elements 38 to the supporting device 48 (see FIG. 1). The thread-reinforced coupling elements 38 are connected via the connecting elements 56 to the flange arms 66 of the flange 64 of the flange device 14. The connecting elements 46, 52, 56 and 74 can be screws. In particular, the connecting elements 46, 52, 56 and 74 can be screws with a hexagonal head.

The flange arms 66 have a recess 76 on which the cover 30 (see FIG. 1) can be supported. Connecting elements 78 via which the cover 30 can be attached to the flange arms 66 are recognisable in the recess 76.

Figure 5:
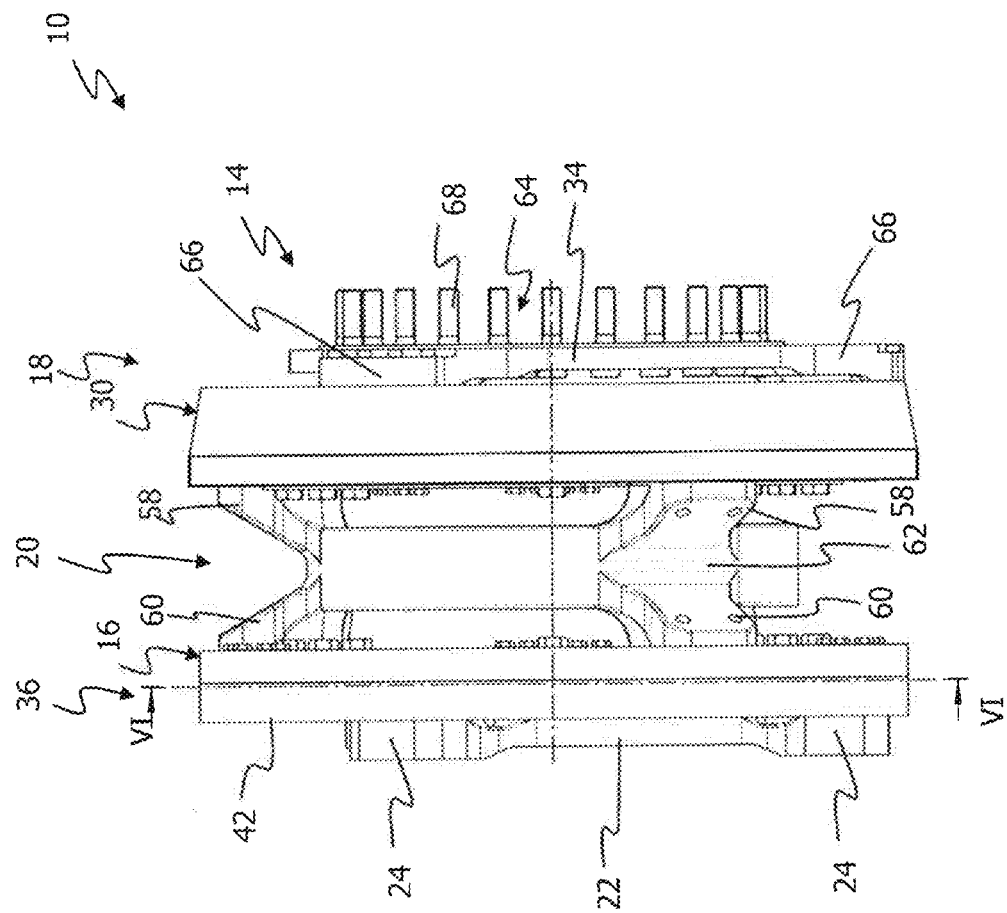
FIG. 5 another plan view of the coupling device.

FIG. 5 shows another plan view of the coupling device 10. In FIG. 5, the flange 12, the supporting device 36 of the coupling 16, the intermediate piece 20, the cover 30, the coupling 18 and the flange device 14 are shown. The intermediate piece 20 has the tubular portion 62 and the arms 58, 60. The arms 58 and 60 extend radially outwards from the tubular portion 62. The intermediate piece 20 is connected via the arms 60 to the first coupling 16 and via the arms 58 to the second coupling 18.

Figure 6:
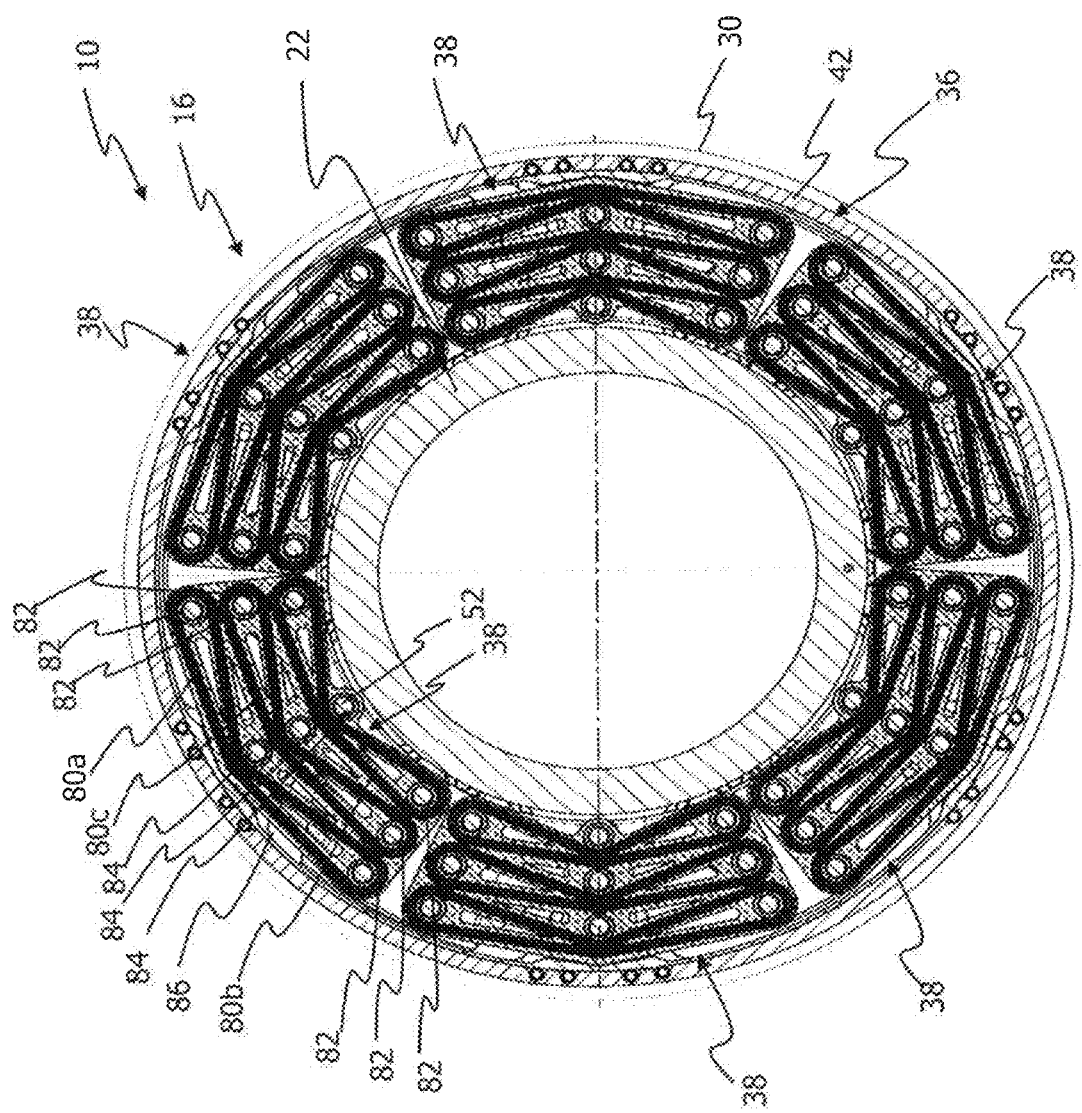
FIG. 6 a sectional view along the section line VI-VI in FIG. 5.

FIG. 6 shows a sectional view along the section line VI-VI in FIG. 5. FIG. 6 thus shows a sectional view of the coupling 16 and the supporting device 36. The hub-shaped portion of the flange 12 and the annular element 42 of the supporting device 36 are recognisable in FIG. 6. Arranged in a radial direction between the hub-shaped portion 22 of the flange 12 and the annular element 42 of the supporting device 36 are the thread-reinforced coupling elements 38. Extending radially externally around the supporting device 36 in the view according to FIG. 4 is the cover 30, which is not shown in portion. In the supporting device 36 shown in portion, several openings are recognisable through which screws extend to connect the two parts of the supporting device 36.

The thread-reinforced coupling elements 38 each have three thread packets 80a, 80b and 80c. Each of the thread packets 80a, 80b and 80c loops around two bushes 82 respectively. In the area between the two bushes 82, deflection elements 84 are provided on which the thread packets 80a, 80b and 80c can be supported. The deflection elements 84 force a kink or curvature onto the thread packets 80a, 80b and 80c. The coupling element 38 as a whole has a kinked or angled form due to this. The connecting elements 52 extend through the deflection elements 84 to connect the coupling elements 38 to the supporting device 36 or to the supporting elements 38.

Figure 7:
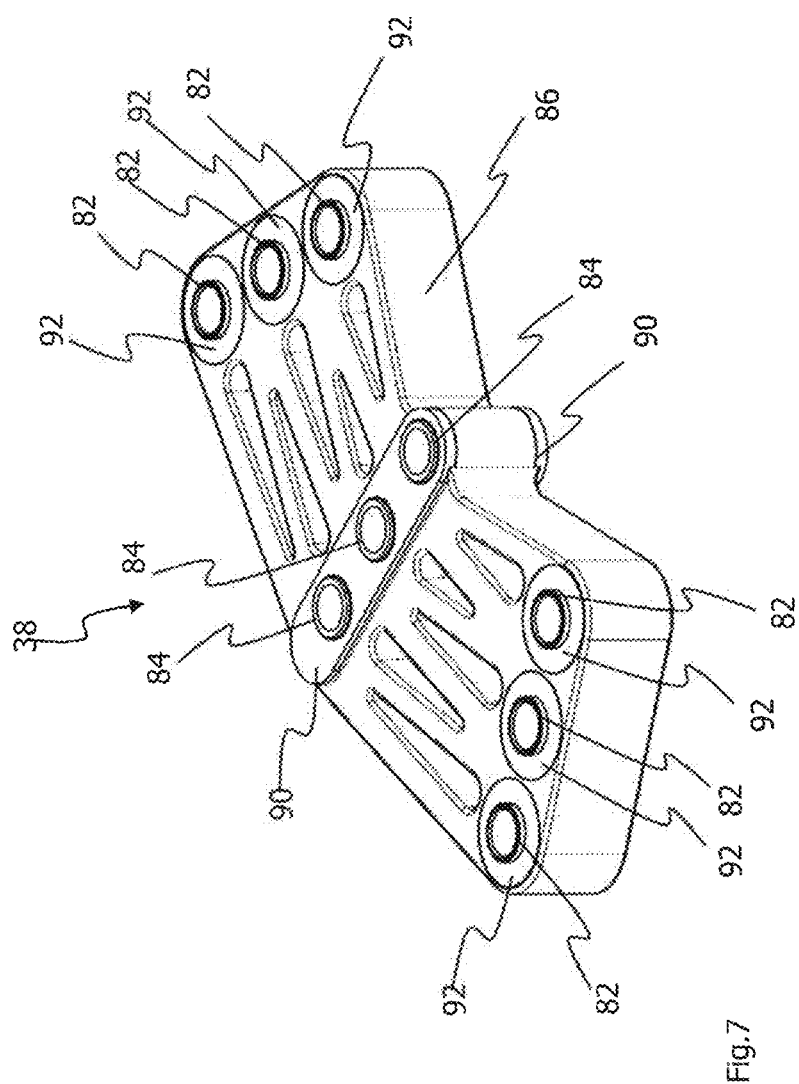
FIG. 7 a perspective view of a thread-reinforced coupling element according to a first exemplary embodiment.

FIG. 7 shows a perspective view of a thread-reinforced coupling element 38 according to a first exemplary embodiment. The thread-reinforced coupling element 38 has six bushes 82 and deflection elements 84. The deflection elements 84 are arranged in an area between the bushes 82. The deflection elements 84 are connected to one another via connecting elements 90, which are arranged on the axial ends of the deflection elements 84. The deflection elements 84 are formed in the form of bushes. Recognisable on the bushes 82 are collar elements 92, which hold thread packets, not shown in FIG. 7, on the bushes 82.

FIG. 8 shows a plan view of the thread-reinforced coupling element 38 according to FIG. 7. The bushes 82, the collar elements 92, the deflection elements 84 and the plate-shaped connecting elements 90 are embedded partially into the elastic body 86. Recognisable in the elastic body 86 are recesses or openings 94, which are formed between the strands of a thread packet 80, not shown in FIG. 9, in the elastic body 86.

FIG. 9 shows a sectional view along the section line IX-IX in FIG. 8. In FIG. 9, the thread packet 80 is shown, which is depicted in section at four points based on the progression of the section line IX-IX. The thread packet 80 loops around the bushes 82. Provided on the bushes 82 are the collar elements 92, which extend in a radial direction starting from the tubular portion of the bushes 82. The collar elements 92 can be formed integrally with the bushes 82. The bushes 92 hold the thread packet 80 in its predetermined axial position on the bush 82. The bushes 82 with the collar elements 92 formed thereon have a bobbin shape.

In the area between the two bushes 82, the deflection element 84 is shown. The deflection element 84 is not looped around or is only scarcely looped around by the thread packet 80. The thread packet 80 runs along the deflection element 84 and rests in an area with one of its strands on the outer circumferential area of the deflection element 84. Furthermore, the recesses or openings 94 are recognisable in the elastic body 86.

Figure 10:
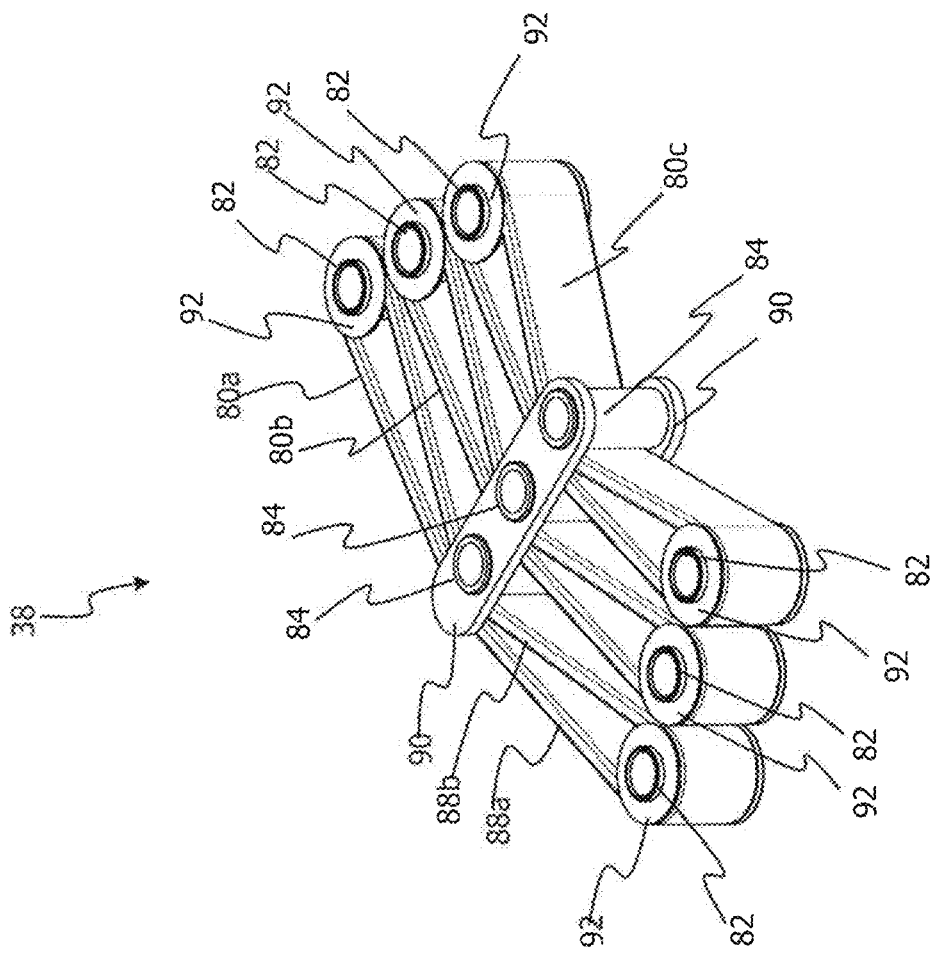
FIG. 10 a perspective view of a thread-reinforced coupling element according to a first exemplary embodiment.
Figure 13:
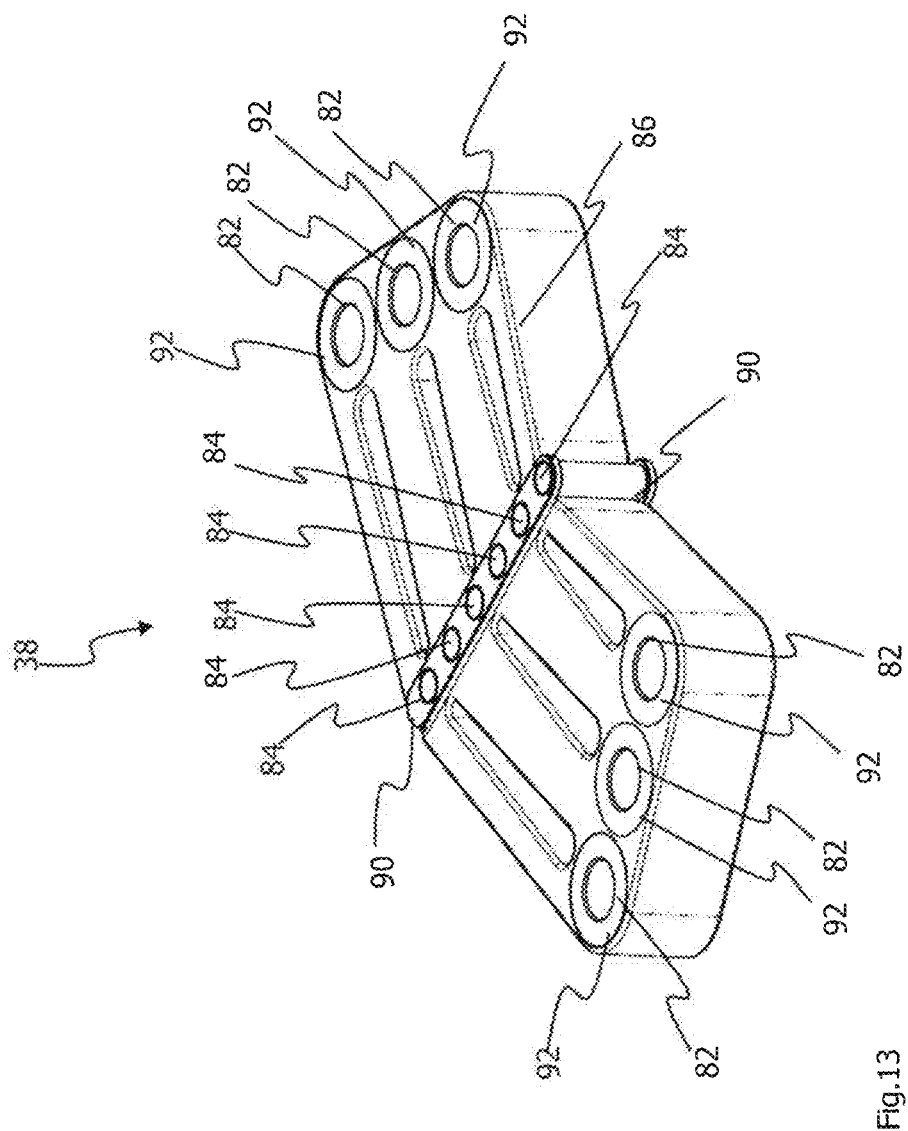
FIG. 13 a perspective view of a thread-reinforced coupling element according to a second exemplary embodiment.
Figure 15:
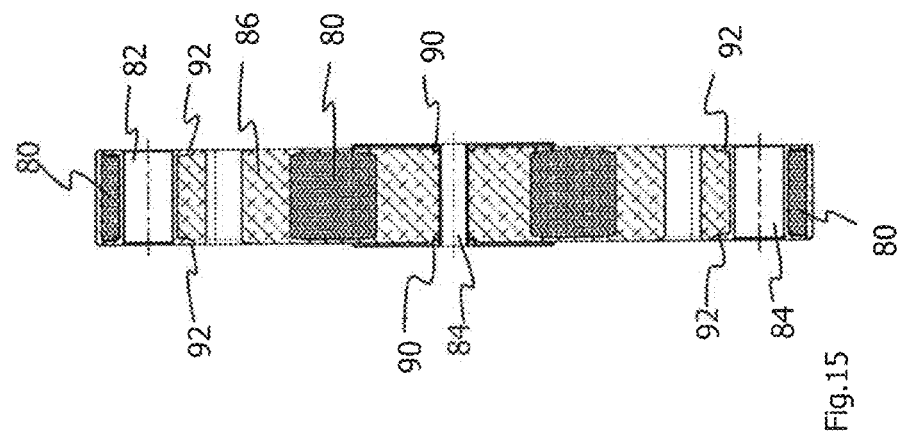
FIG. 15 an elevation view of a thread-reinforced coupling element according to a second exemplary embodiment.
Figure 14:
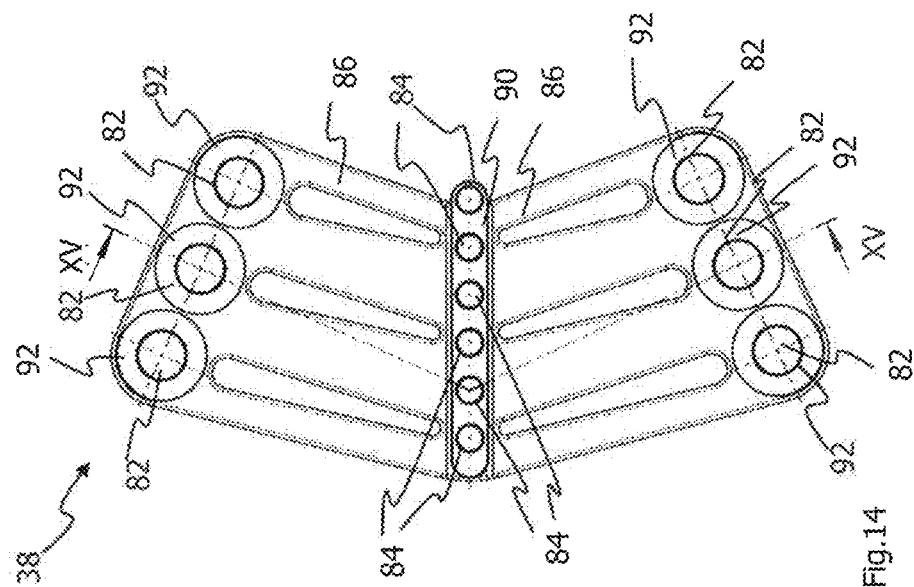
FIG. 14 a plan view of a thread-reinforced coupling element according to a second exemplary embodiment.
Figure 16:
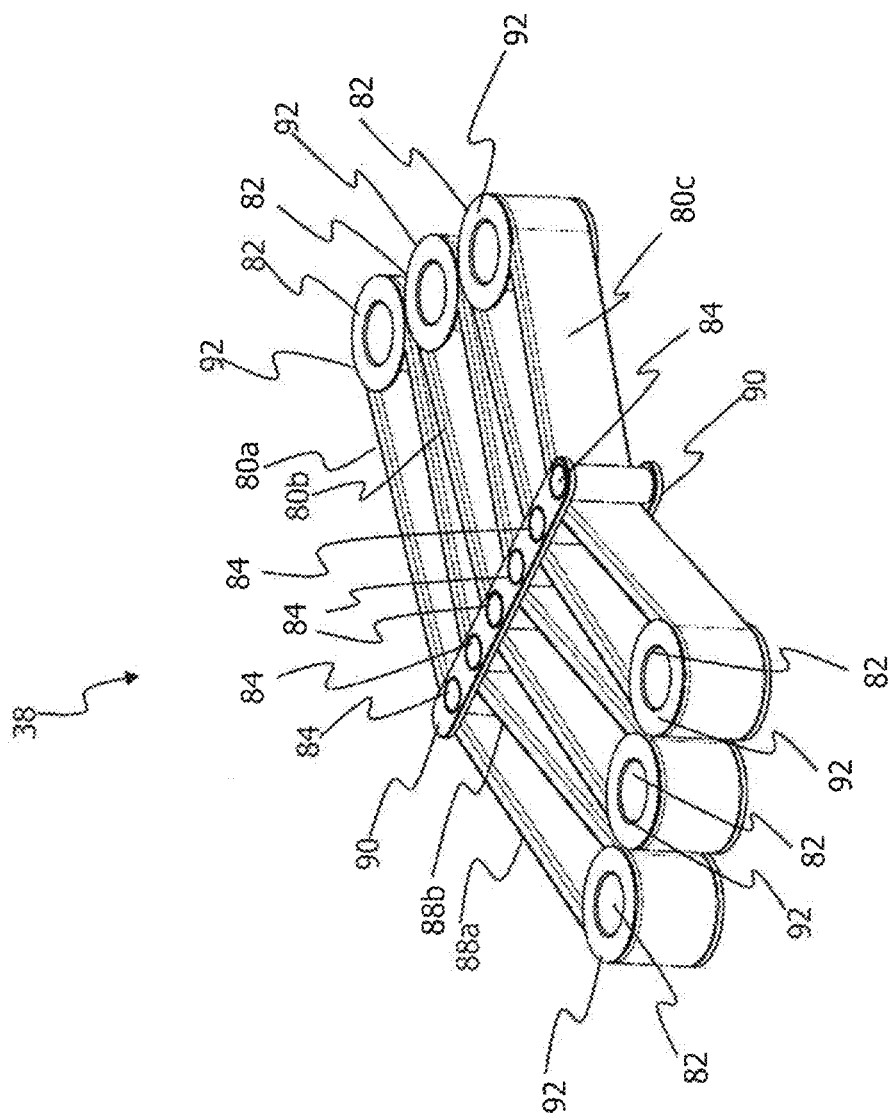
FIG. 16 a perspective view of a thread-reinforced coupling element according to a second exemplary embodiment.

FIG. 10 shows a perspective view of the basic body of the thread-reinforced coupling element 38. The three thread packets 80*a*, 80*b*, 80*c* of the thread-reinforced coupling element 38 are recognisable in FIG. 10. Each of the thread packets 80*a*, 80*b*, 80*c* loops around two bushes. Each of the thread packets 80*a*, 80*b*, 80*c* forms a unit with two bushes 82, which are looped around by the thread packet 80*a*, 80*b*, 80*c*. Provided between the bushes 82 are the deflection elements 84, which can deflect and support the thread packets 80*a*, 80*b*, 80*c*. The deflection elements 84 are connected to one another via plate-shaped connecting elements 90. A deflection element 84 brings the two strands 88*a* and 88*b* formed by the thread packet between the bushes 82 close to one another, so that the strand 88*b* assumes a more strongly kinked progression than the strand 88*a*. The strand 88*a* is less kinked compared with the kink in strand 88*b*. Each of the thread packets 80*a*, 80*b*, 80*c* thus runs kinked between the bushes 82.

FIG. 11 shows a lateral view of the thread-reinforced coupling element 38. In the view according to FIG. 11, the elastic body 86, the connection plates 90 partially embedded therein and the ends of the bushes 82 are recognisable.

FIG. 12 shows a sectional view along the section line XII-XII in FIG. 11. The thread packets 80*a*, 80*b*, 80*c* each loop around precisely two bushes. In the area between the bushes, the thread packets 80*a*, 80*b*, 80*c* form two strands 88*a* and 88*b*. The deflection elements 84 deflect these strands 88*a* and 88*b* in the area between the bushes. The strands 88*a* and 88*b* are brought closer to one another by this deflection in the area of the deflection elements 84. The strand 88*b* rests on an area of the outer circumferential surface of a deflection element 84. The strand 88*a* rests in this area, i.e. in the area of the deflection element 84, on the strand 88*b*. The thread packet 80*a*, 80*b*, 80*c* thus assumes an angled progression. The deflection elements 84 divide the thread packets 80*a*, 80*b*, 80*c* into two limbs, each of which has a bush 82 and which run at an angle to one another. The bushes 82, the thread packets 80*a*, 80*b*, 80*c* and deflection elements 84 are embedded into the elastic body 86.

FIGS. 13 to 18 show a thread-reinforced coupling element 38 according to a second exemplary embodiment. The substantial difference from the first exemplary embodiment according to FIGS. 7 to 12 lies in the fact that two deflection elements 84 are associated with each thread packet 80*a*, 80*b*, 80*c*. Each strand 88*a*, 88*b* of a thread packet 80*a*, 80*b*, 80*c* is deflected in the area between the bushes 82 by its own deflection element 84. The strands 88*a*, 88*b* of the thread packets 80*a*, 80*b*, 80*c* thus no longer lie adjacent to one another in the area of the deflection element 84 but are separated from one another by a deflection element 84. Each of the strands 88*a*, 88*b* has a kink set by a deflection element 84. The deflection elements 84 are connected to one another via the plate-shaped connecting elements 90. Compared with the exemplary embodiment described above, the deflection elements 84 have a reduced diameter.

Figure 19:
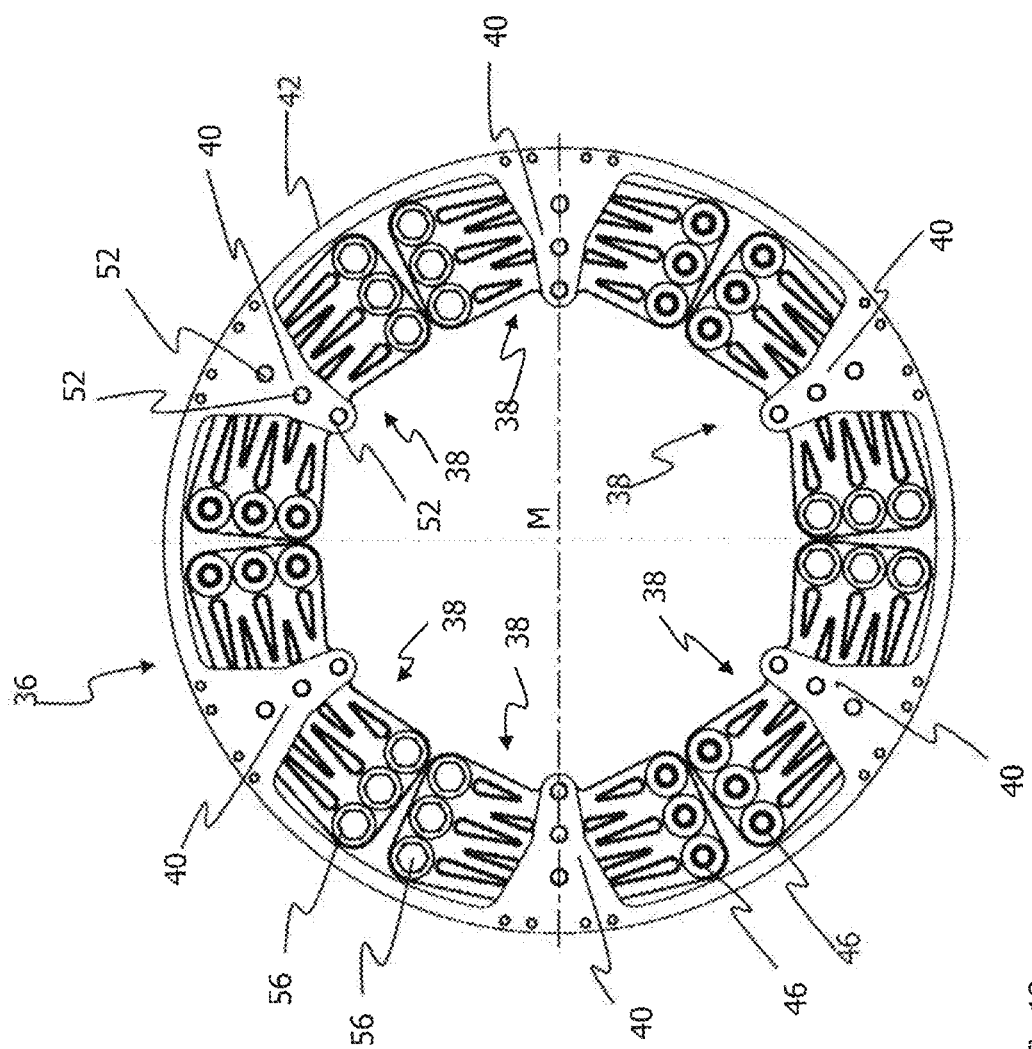
FIG. 19 a plan view of the supporting devices of the coupling device according to FIGS. 1 to 6 with coupling elements mounted thereon.

FIG. 19 shows a front view of a supporting device 36 of the first coupling 18 (see FIG. 1) with thread-reinforced coupling elements 38 according to the first exemplary embodiment shown in FIGS. 7 to 12 fitted thereto. The supporting device 36 has the annular portion 42 and supporting elements 40, which extend radially inwards starting from the annular portion 42. The supporting elements 40 are connected to the deflection elements 84 (see FIGS. 7 to 12) via screws 52. With its supporting elements 40 the supporting device 36 supports a central area of the thread-reinforced coupling elements 38, in which area the deflection elements 84 are arranged. The thread-reinforced coupling elements 38 can be screwed to the first flange 12 via the screws 56. The screws 56 are led through the bushes 82 (see FIGS. 7 to 12) to this end. Screws 46 can be led through the bushes 82 in the same way to connect the thread-reinforced coupling elements 38 to the intermediate piece 20 (see FIG. 1).

Figure 20:
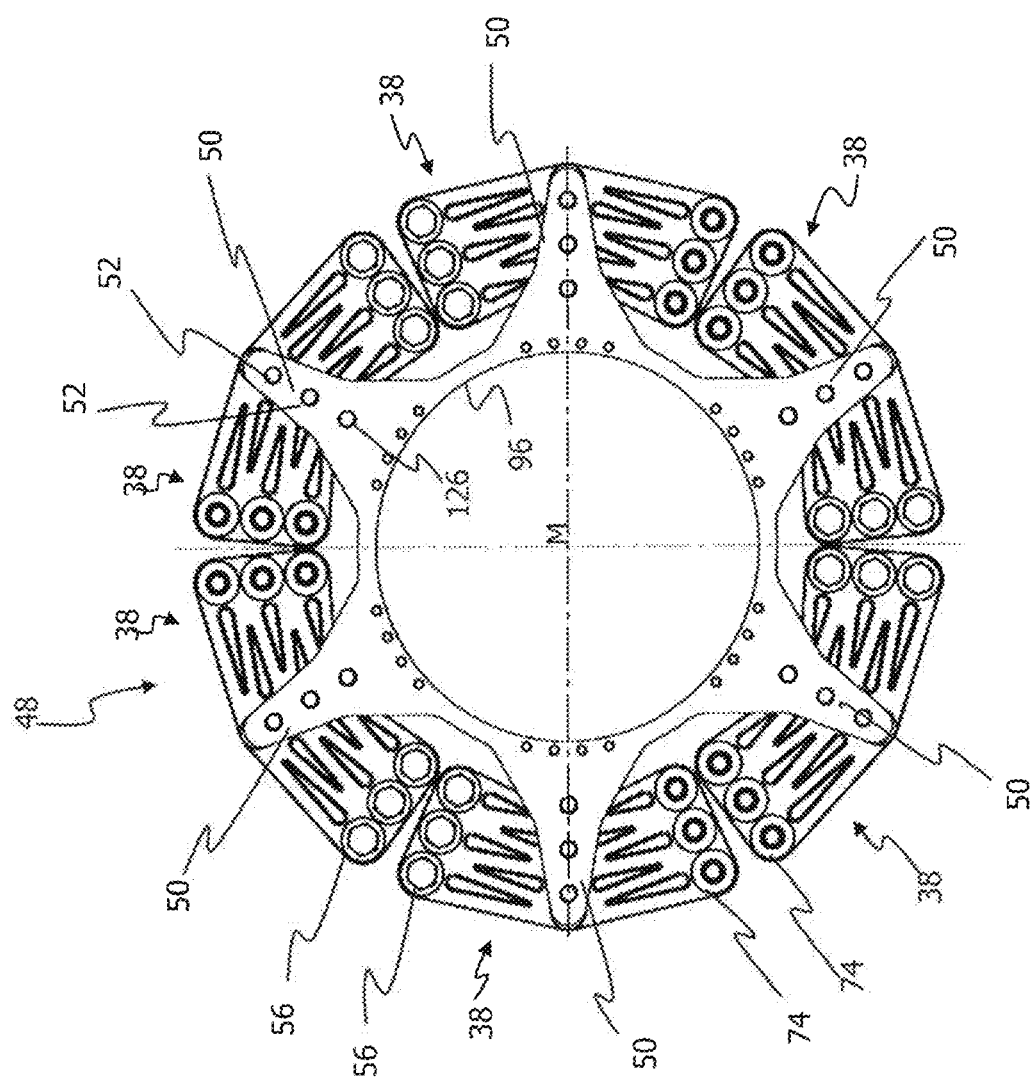
FIG. 20 a plan view of the supporting devices of the coupling device according to FIGS. 1 to 6 with coupling elements mounted thereon.

FIG. 20 shows a front view of the supporting device 48 of the second coupling 18. The supporting device 48 has an annular portion 96 and supporting elements 50, which extend radially outwards starting from the annular portion 96. The annular portion 96 extends radially within the thread-reinforced coupling elements 38. The thread-reinforced coupling elements 38 are connected via the screws 52 to the supporting elements 50. The screws 52 are led to this end through the deflection elements 84 (see FIGS. 7 to 12). The thread-reinforced coupling elements 38 can be screwed via the screws 56 to the second flange 64 (see FIG. 1). The screws 74 connect the thread-reinforced coupling elements 38 to the intermediate piece 20 (see FIG. 1). The supporting elements 50 extending radially outwards hold the deflection elements 84 and thus the central area of the thread-reinforced coupling elements 38 in a predetermined radial position. The unit formed from supporting device 48 and the coupling elements 38 thereby retains its polygonal structure.

Depending on their loading (tensile or compression), the thread-reinforced coupling elements 38 can be pulled radially inwards or pressed radially outwards without the supporting device 36, 48. The supporting device 36, 48 supports the coupling elements 38 in a radial direction. The supporting device 36, 48 holds the thread-reinforced coupling elements 38 in their predetermined radial position. This applies in particular to the area of the deflection elements 84, which are connected to the supporting elements 40, 50. In particular, the supporting elements 40, 50 prevent the central area with the deflection elements 84 of the thread-reinforced coupling elements 38 between the bushes 82 from being displaced in the direction of the centre line M. The supporting elements 40, 50 accordingly ensure that the coupling or the unit formed from the supporting device 36, 48 and the thread-reinforced coupling elements 38 retains its polygonal structure even in operation of the coupling. Large deflection angles can be compensated for thereby and the radial installation space optimally utilised, as a polygon with as many edges as possible can optimally fill an installation space in the form of a circle or hollow cylinder.

FIG. 21 shows a plan view of a bogie 1000. The bogie 1000 has two wheelsets 1002 and 1004. Each wheelset 1002, 1004 has two wheels 1006, 1008, which are connected to one another by an axle 1010. The coupling device 10 is arranged coaxially with the axle 1010. The coupling device 10 connects the wheelset 1002, 1004 to the motor 1012. The coupling 10 can be coupled to the axle 1010 and to a motor output shaft (not shown) of the motor 1012. The coupling 10 and the motor 1012 can be arranged coaxially with the axle 1010. The first flange 12 (see FIG. 1) of the coupling device 10 can be connected non-rotatably to the axle 1010. The flange 12 can be pressed onto the axle 1010, for example. The second flange 64 can be connected to a motor output shaft (not shown) of the motor 1012. The connecting elements 68 of the flange 64 can be connected to the motor output shaft to this end. The axle 1010 extends through the coupling device 10 and also through the motor 1012. The motor 1012 can be a traction motor, which can drive the wheelset 1002, 1004 without transmission.

As is recognisable in particular in FIG. 21, the coupling 10 requires very little installation space in an axial direction and can nevertheless take up a large deflection angle in order to be able to compensate for relative movements between the motor 1012 and the wheelset 1002, 1004.

The supporting devices described above support the thread-reinforced joint devices in a radial direction. The supporting device can hold the thread-reinforced joint devices in their predetermined radial position. The supporting devices prevent the thread-reinforced joint devices from moving radially inwards or radially outwards on account of the reaction forces arising in operation of the coupling or of the thread-reinforced joint device. The supporting elements of the supporting device accordingly ensure that the coupling retains its polygonal structure even in operation. Large deflection angles can be compensated for thereby and the radial installation space optimally utilised, as a polygon with as many edges as possible can optimally fill an installation space in the form of a circle or hollow cylinder.

The invention claimed is:

1. A coupling device for a vehicle drive, comprising:
at least one first coupling, which has at least one first thread-reinforced joint device, wherein the first thread-reinforced joint device has at least one thread packet, which is embedded into at least one elastic body,
wherein the at least one first coupling has at least one supporting device, which is connected to the first thread-reinforced joint device, wherein the at least one supporting device supports the first thread-reinforced joint device in a radial direction, wherein the at least one supporting device is supported in an overhung manner, wherein the at least one supporting device has several supporting elements which extend in a radial direction and are connected to the thread-reinforced joint device, and wherein the at least one supporting device has at least one portion, which connects the supporting elements to one another and at least one selected from the group consisting of (i) extends radially outside the first or second thread-reinforced joint device and (ii) extends radially inside the first or second thread-reinforced joint device.

2. The coupling device according to claim 1, wherein the coupling device further has:
at least one second coupling, which has at least one second thread-reinforced joint device, wherein the second thread-reinforced joint device has at least one thread packet, which is embedded into at least one elastic body, and
at least one intermediate piece, which connects the first coupling and the second coupling to one another.

3. The coupling device according to claim 2, wherein the at least one second coupling has at least one supporting device, which is connected to the second thread-reinforced joint device, wherein the at least one supporting device supports the second thread-reinforced joint device in a radial direction.

4. The coupling device according to claim 2, wherein the at least one supporting device supports the at least one thread packet of the first thread-reinforced joint device or of the second thread-reinforced joint device in a radial direction.

5. The coupling device according to claim 2, wherein the at least one intermediate piece is supported in an overhung manner.

6. The coupling device according to claim 2, wherein at least one selected from the group consisting of (i) the first coupling is connected to a first flange, which has a hub-shaped portion, and (ii) the second coupling is connected to a second flange, which is formed with a connecting portion to take up several connecting elements.

7. The coupling device according to claim 6, wherein the at least one intermediate piece comprises arms; and wherein the first flange and the second flange each have several first and second flange arms, which are connected via the first and the second thread-reinforced joint device to the arms of the at least one intermediate piece, wherein supporting elements are arranged in a circumferential direction between the flange arms of the first flange and the arms of the intermediate piece or the flange arms of the second flange and the arms of the at least one intermediate piece.

8. The coupling device according to claim 7, wherein at least one selected from the group consisting of (i) a thread-reinforced coupling element connects a flange arm of the first flange, an arm of the at least one intermediate piece and a supporting element to one another, and (ii) wherein a thread-reinforced coupling element connects a flange arm of the second flange, an arm of the at least one intermediate piece and a supporting element to one another.

9. The coupling device according to claim 2, wherein at least one selected from the group consisting of the first thread-reinforced joint device and the second thread-reinforced joint device are composed of several thread-reinforced coupling elements, which each have at least one elastic body and at least one thread packet.

10. The coupling device according to claim 9, wherein each of the several thread-reinforced coupling elements, comprises:
at least two bushes, wherein the at least one thread packet loops around the at least two of the bushes, and
at least one deflection element, wherein the at least one thread packet rests on the at least one deflection element.

11. The coupling device according to claim 10, wherein the at least one deflection element is arranged between the at least two bushes.

12. The coupling device according to claim 10, wherein the at least one deflection element is positioned such that the at least one thread packet extends in the area between the bushes with at least one kink or a curvature.

13. The coupling device according to claim 10, wherein each of the several thread-reinforced coupling elements has several thread packets, wherein associated with each thread packet is at least one deflection element.

14. The coupling device according to claim 13, wherein the deflection elements are connected to one another.

15. The coupling device according to claim 10, wherein the at least one thread packet forms two strands in the area between at least two bushes, wherein at least one strand of the at least one thread packet rests on the at least one deflection element.

16. The coupling device according to claim 15, wherein associated with the at least one thread packet are at least two deflection elements, wherein one strand of the at least one thread packet rests on one of the deflection elements.

17. A bogie for a rail vehicle, comprising:
at least one wheelset, which has an axle,
at least one motor, and
at least one coupling device according to claim 1, wherein the coupling device couples the motor to the axle.

18. The bogie according to claim 17, wherein at least one selected from the group consisting of the motor and the at least one coupling device is arranged coaxially with the axle.

19. The bogie according to claim 17, wherein at least one selected from the group consisting of (i) a first flange of the coupling device connected non-rotatably to the axle and (ii) a second flange of the coupling device is connected via a connecting portion to a motor output shaft of the motor.

20. A rail vehicle comprising at least one bogie according claim 17.

21. A rail vehicle comprising at least one coupling device according to claim 1.

* * * * *